US010078615B1

(12) United States Patent
Edelhaus et al.

(10) Patent No.: US 10,078,615 B1
(45) Date of Patent: Sep. 18, 2018

(54) ETHERNET CONTROLLER WITH INTEGRATED MULTI-MEDIA PAYLOAD DE-FRAMER AND MAPPER

(71) Applicant: Aquantia Corporation, San Jose, CA (US)

(72) Inventors: Simon Edelhaus, San Ramon, CA (US); Alexey Andriyanov, Novgorod (RU)

(73) Assignee: Aquantia Corp., Milpitas, CA (US)

( * ) Notice: Subject to any disclaimer, the term of this patent is extended or adjusted under 35 U.S.C. 154(b) by 433 days.

(21) Appl. No.: 14/858,902

(22) Filed: Sep. 18, 2015

(51) Int. Cl.
G06F 13/42 (2006.01)
G06F 13/28 (2006.01)
H04L 29/06 (2006.01)
G06F 13/40 (2006.01)

(52) U.S. Cl.
CPC .......... *G06F 13/4282* (2013.01); *G06F 13/28* (2013.01); *G06F 13/404* (2013.01); *H04L 65/4069* (2013.01)

(58) Field of Classification Search
CPC ..... G06F 13/4282; G06F 13/28; G06F 13/404
USPC ........................................................ 710/316
See application file for complete search history.

(56) References Cited

U.S. PATENT DOCUMENTS

| | | | | |
|---|---|---|---|---|
| 6,075,773 A * | 6/2000 | Clark | ................... | H04L 43/50 370/241 |
| 6,266,753 B1 * | 7/2001 | Hicok | ................ | G06F 12/1081 345/555 |
| 8,842,670 B2 * | 9/2014 | Majumdar | .............. | H04L 45/26 370/392 |
| 2006/0135167 A1 * | 6/2006 | Wybenga | ................ | H04L 45/00 455/445 |
| 2006/0233194 A1 * | 10/2006 | Loprieno | .............. | H04J 3/1658 370/466 |
| 2008/0028103 A1 * | 1/2008 | Schlansker | ............. | H04L 49/90 709/250 |
| 2009/0077326 A1 * | 3/2009 | Motohashi | .......... | G06F 12/0692 711/153 |

(Continued)

OTHER PUBLICATIONS

"Understanding IEEE 1722", Presentation slides by Robert Boatright, Mar. 9, 2009, Vancouver, BC, 33 pages.

(Continued)

*Primary Examiner* — Christopher Shin
(74) *Attorney, Agent, or Firm* — Lance Kreisman; Peninsula Patent Group

(57) ABSTRACT

A method of operation in a system is disclosed. The system includes a system processor, main memory coupled to the system processor, and a serial input/output (IO) interface coupled to the processor. The method includes de-framing multi-media packet data with a local area network peripheral device such as Ethernet, the multi-media packet data having a timing reference. The packet data is mapped to the main memory with the Ethernet peripheral device. The multi-media packet data is then transferred to the main memory as multi-media data, and stored in storage locations of the main memory in accordance with the mapping. The mapping information is accessed from device Host operating system with a second peripheral device via the serial I/O interface. The second peripheral device directly accesses the main memory storage locations. Significant power savings is realized for the CPU.

8 Claims, 4 Drawing Sheets

(56) References Cited

U.S. PATENT DOCUMENTS

| | | | |
|---|---|---|---|
| 2010/0223419 A1* | 9/2010 | Cardona | G06F 9/5077 |
| | | | 711/6 |
| 2011/0131582 A1* | 6/2011 | Fritz | G06F 9/5011 |
| | | | 718/104 |
| 2011/0280259 A1 | 11/2011 | Diab et al. | |
| 2012/0148248 A1* | 6/2012 | Li | H04J 3/065 |
| | | | 398/58 |
| 2012/0227056 A1* | 9/2012 | Ralston | G06F 9/545 |
| | | | 719/312 |
| 2012/0327300 A1 | 12/2012 | Hutchings et al. | |
| 2015/0019923 A1* | 1/2015 | Michels | G06F 15/17331 |
| | | | 714/718 |
| 2015/0052257 A1 | 2/2015 | Mora et al. | |
| 2016/0021430 A1* | 1/2016 | LaBosco | H04N 21/4398 |
| | | | 725/31 |

OTHER PUBLICATIONS

XMOS Sales Literature, "Ethernet AVB Networking Solutions", 2014, 4 pages.

Betanews.com article: "Broadcom Looks to Replace HDMI with Ethernet", Mar. 31, 2009, 3 pages.

\* cited by examiner

ETHERNET CONTROLLER WITH INTEGRATED MULTI-MEDIA PAYLOAD DE-FRAMER AND MAPPER

TECHNICAL FIELD

The disclosure herein relates to communications systems, and more specifically to local area network systems and methods.

BACKGROUND

Multi-media data streaming represents an increasingly large portion of overall Internet traffic. One traditional method to enable multi-media data transfers over a proprietary high speed connection with very precise timing and high link stability involves an SDI interface. The SDI interface generally provides for data speeds up to 6 Gbps.

Recently, to achieve the same high precision and stable link quality, Audio Video Bridge (AVB) standards have been ratified to enable high-speed synchronized multi-media data transfers over high-speed local area networks, such as Ethernet and 10GBASE-T. With this new approach, conventional adapters (i.e. Ethernet and WiFi) are used to transfer high precision, broadcast quality multi-media, instead of proprietary SDI ones. As with any other multi-media distribution system, processing functions on the end point (for example a computer, laptop, tablet, automotive embedded device, IOT device, video disk recorder, transcoder, or video end point) associated with the multi-media data are often carried out by large, high-power processors. This may be undesirable depending on the application.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of networking systems, adapter cards and associated methods are disclosed herein. One embodiment of a method of operation in a system is disclosed. The system includes a system processor, main memory coupled to the system processor, and a serial input/output (IO) interface coupled to the processor. The method includes de-framing multi-media packet data with an Ethernet peripheral device, the multi-media packet data having a timing reference. The packet data is mapped to the main memory by the Ethernet peripheral device. The multi-media packet data is then transferred to the main memory as multi-media data, and stored in storage locations of the main memory in accordance with the mapping. The mapping information is made available by the Ethernet peripheral device to the host operating system via software API (application programming interface) calls, for reference by other peripherals, and is accessed by other multi-media peripheral processing devices via host operating system API queries. The other devices directly access the multi-media data in the main memory storage locations. In some implementations, the network device and the other multi-media peripheral processing devices are co-located on the same physical adapter, with one serial input/output (IO) interface only. In this case, the main host memory is mapped between the devices, and the same mapping concept is utilized. All the devices share the memory directly.

In a further embodiment, a network adapter is disclosed. The adapter includes an Ethernet physical (PHY) device and an Ethernet media access controller (MAC) having a first interface coupled to the PHY and a second interface for coupling to an external local bus. The Ethernet MAC includes de-framing logic to extract ingress multi-media data from packets framed in accordance with multi-media streaming protocol. Memory mapping logic is provided to generate a mapping of the multi-media data to address locations in a system main memory. The system main memory is external to the network adapter card and coupled to a system processor. The network adapter card is configured to communicate the mapping to a host operating system, for reference by other peripheral devices coupled to the local bus.

Figure 1:
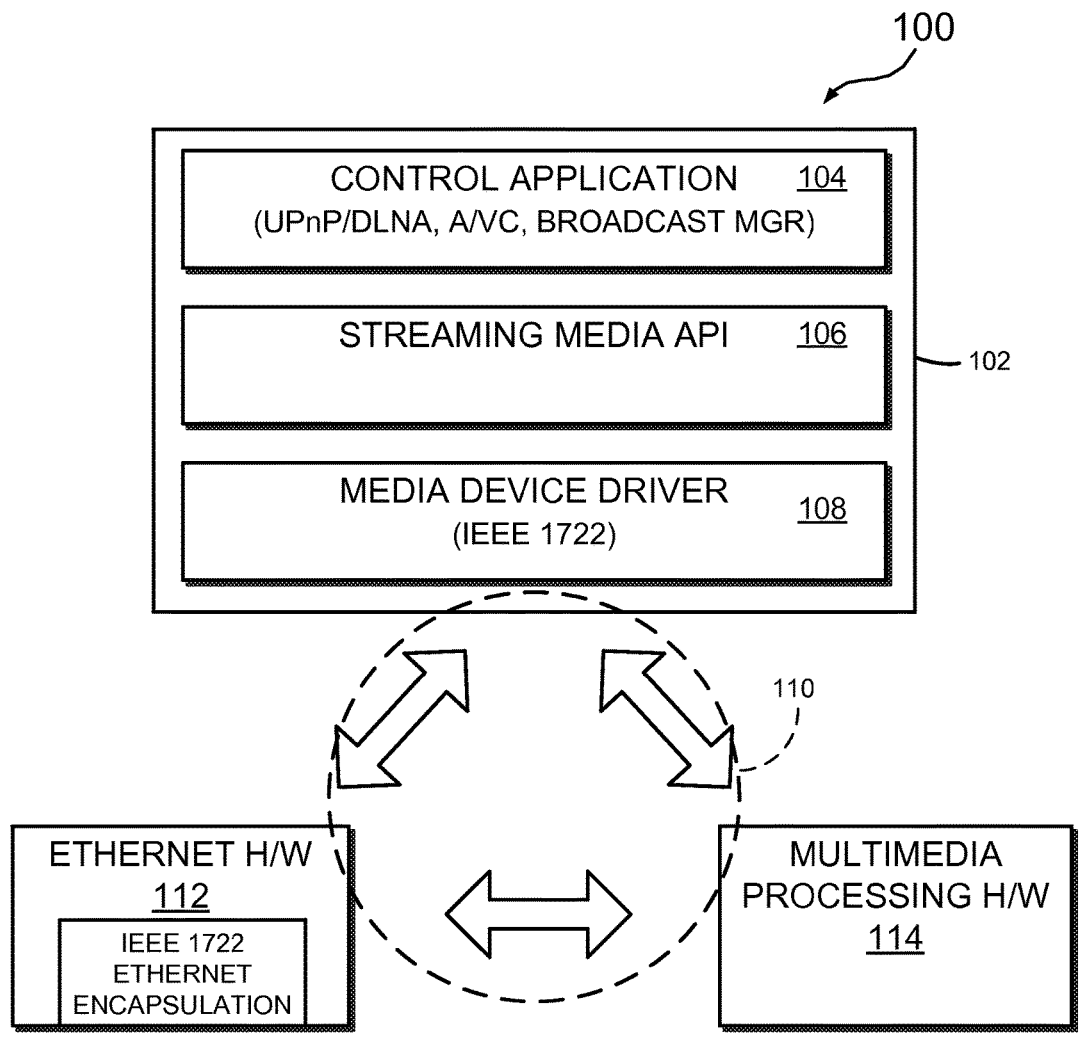
FIG. 1 illustrates a high-level block diagram of a system including a host computing resource, and peripheral devices coupled to the host.

FIG. 1 is a logical layered block diagram illustrating one embodiment of a streaming multi-media processing system, generally designated 100. The system includes a host computing resource, such as a general purpose computer or server 102. Running on the computer are one or more multi-media streaming applications 104 based on standards, such as Universal Plug & Play (UPnP), Digital Living Network Alliance (DLNA), and so forth. In one embodiment, the computer, or server, runs on a Microsoft Windows platform that seamlessly discovers the presence of other multi-media devices on a network, and establishes functional network services for data sharing.

With continued reference to FIG. 1, in addition to the control applications noted above, the server software platform 102 includes a streaming media application programming interface (API) 106, and a media device driver 108 such as that provided by IEEE 1722 or RFC 2326 or others. The media device driver acts to discover various parameters associated with the network tied to the server.

Further referring to FIG. 1, an input/output (I/O) interface 110, such as PCI express (PCIe) and/or QPI, provides local bus paths for exchanging data and control information between the computer/media server 102 and peripheral devices 112 and 114. As an example, described more fully below, one of the peripheral devices is realized as Ethernet hardware 112 in the form of an Ethernet adapter card. A second of the peripheral devices 114 may be realized as multi-media processing hardware such as a video transcoder that might employ a graphics processing unit (GPU). Other examples might involve multiple devices disposed on the same card.

With the server 102 and the peripherals 112 and 114 interconnected via the local bus interface 110, memory mappings associated with multi-media data may be accessed by all participating peripheral devices, by means of mappings created via systems calls from the host operating system, such that memory blocks for the multi-media data can be allocated, and data retrieved from the memory, with little to no involvement from the server processor. This enables the server processor to enter a resting or "sleep" mode that results in significant power savings.

Figure 2:
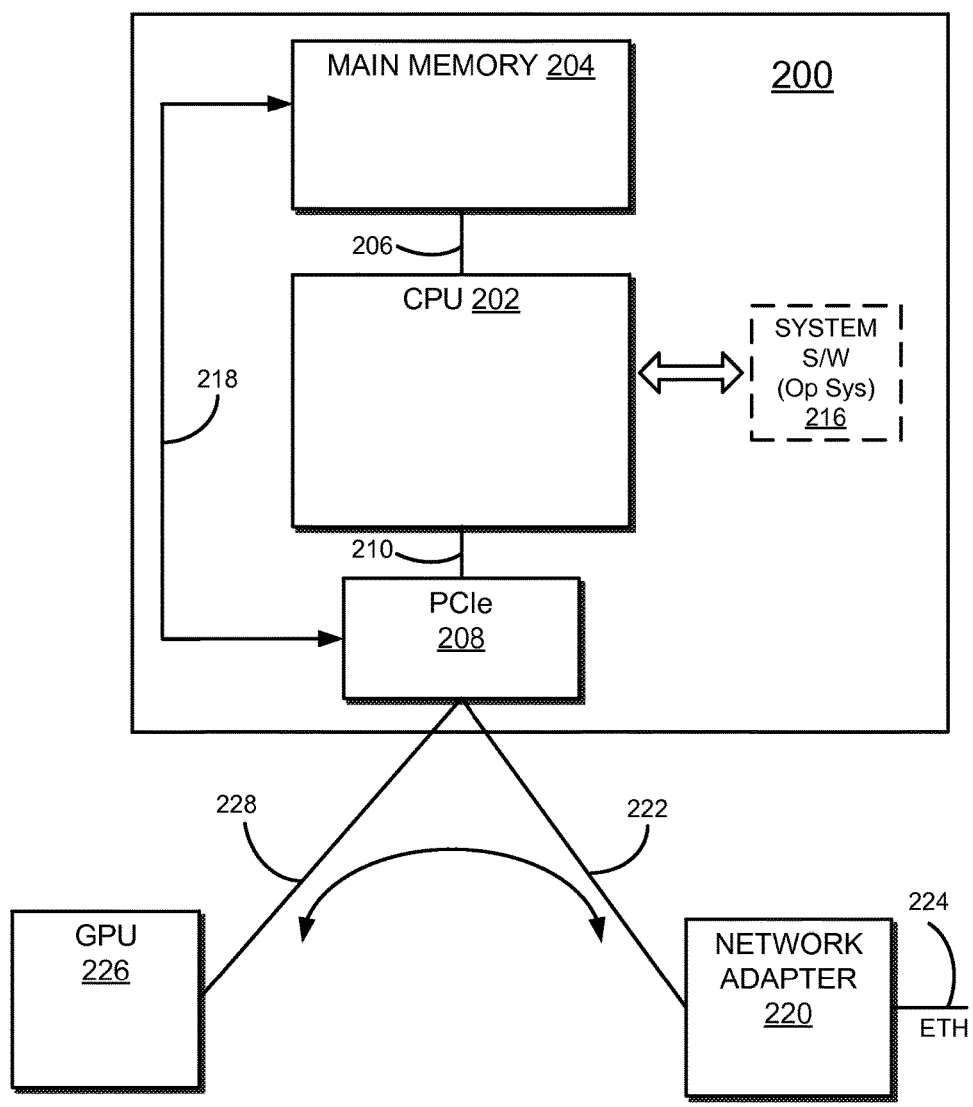
FIG. 2 illustrates the system of FIG. 1 in further detail.

FIG. 2 illustrates one specific embodiment of the system of FIG. 1 in further detail. A computer 200 includes a central processing unit (CPU) 202 that couples to a main memory 204 via a memory interface 206, and an I/O interface module (such as PCIe) 208 via I/O interface 210. The CPU System software 216 manages normal memory management operations to enable the CPU 202, in a normal operating mode, to access data stored in accordance with generated memory mappings.

With continued reference to FIG. 2, for one specific embodiment, the I/O interface 208 takes the form of a PCIe controller. PCIe employs a serial data protocol and generates main memory mappings for incoming data from logical storage locations to physical storage locations in the main memory. For normal operations, the PCIe mappings of all the involved peripherals are fed to the CPU 202 and operating system reserved settings and they do not overlap. The PCIe interface is also able to carry out data transfers between the interface and the main memory 204 via an on-chip bus 218. The main memory 204 may be realized by DRAM or SRAM storage that is quickly accessible via the CPU 202 and the PCIe interface 208. The PCIe controller also includes a media device driver 108 (FIG. 1) that discovers network parameters, such as when multi-media devices become connected to the network.

Further referring to FIG. 2, for one embodiment, an Ethernet adapter card 220 connects to the PCIe interface 208 via one or more serial links 222. The Ethernet adapter card generally includes an Ethernet port 224 that interfaces with a high-speed Ethernet network, and a PCIe port that interfaces with the PCIe interface 208. A second peripheral device 226, such as a video transcoding device with a GPU, couples to the PCIe interface 208 via one or more serial links 228.

Figure 3:
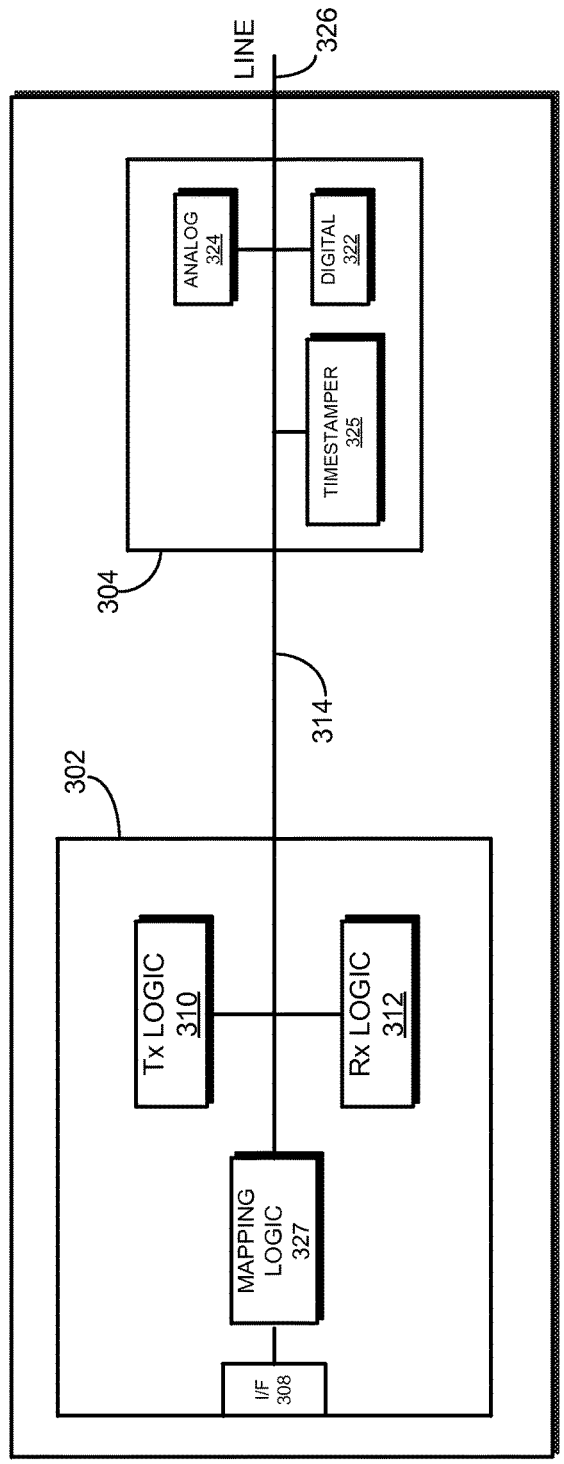
FIG. 3 illustrates a network adapter card for use in the system of FIG. 1.

FIG. 3 illustrates one embodiment of an Ethernet adapter card, generally designated 300, in further detail. The card 300 includes a media access controller (MAC) 302 that connects to a physical device (PHY) 304 in the form of an Ethernet transceiver. The MAC 302 includes mapping logic in the form of a DMA (direct memory access) controller 327 that employs an input/output I/O interface 308, such as PCIe, and includes respective transmit and receive logic circuits 310 and 312. The logic circuits couple to the PHY via an MII like KR interface such as (but not limited to) XFI, USXGMII, XGMII, SGMII interface 314. The PHY includes a matching MII like KR interface, digital logic 322 and analog logic 324. The PHY includes a timestamp generator 325 for associating a timing reference for data transferred to and from the MAC and PHY on the network. A line interface 326 couples the Ethernet card to an Ethernet network.

For one embodiment, the MAC 302 driver in the Host operating system, and/or internal microprocessor includes software/firmware to carry out a variety of multi-media processing in accordance with multiple audio video bridging (AVB) standards. An upper MAC logic layer of the MAC carries out discovery, enumeration, control and connection management in accordance with IEEE 1722.1. This involves sending media payloads as part of an Ethernet frame, among other things. To identify other devices that support the encapsulation of the media payload, IEEE 802.1BA is supported in the upper MAC logic layer.

Further referring to FIG. 3, the MAC mapping logic 327 employs a direct memory access (DMA) controller, that utilizes memory addresses information provided by the Host for multi-media data being transferred to the main memory. The memory mapping information may be communicated to the Host operating system 216 (FIG. 2), to enable the second peripheral device 226 access to the main memory addresses originally allocated for the Ethernet adapter card 220. In this manner, the host CPU 202 can be bypassed (or maintained in a sleep mode), resulting in significant power savings.

For one specific embodiment, the upper MAC logic layer of the MAC 302 also supports a protocol, such as IEEE 802.1Qat, that discovers a data transfer path from one multi-media device to another multi-media device. To ensure synchronous operation within an AVB domain, the upper MAC provides a clock slave state machine in accordance with IEEE 1588 PTPv2 and IEEE 802.1AS.

The MAC 302 also incorporates a lower MAC logic layer, in the form of hardware, which supports, among other things, hardware Priority Flow Control (PFC) frame generation and detection in accordance with IEEE 802.1Qbb.

Figure 4:
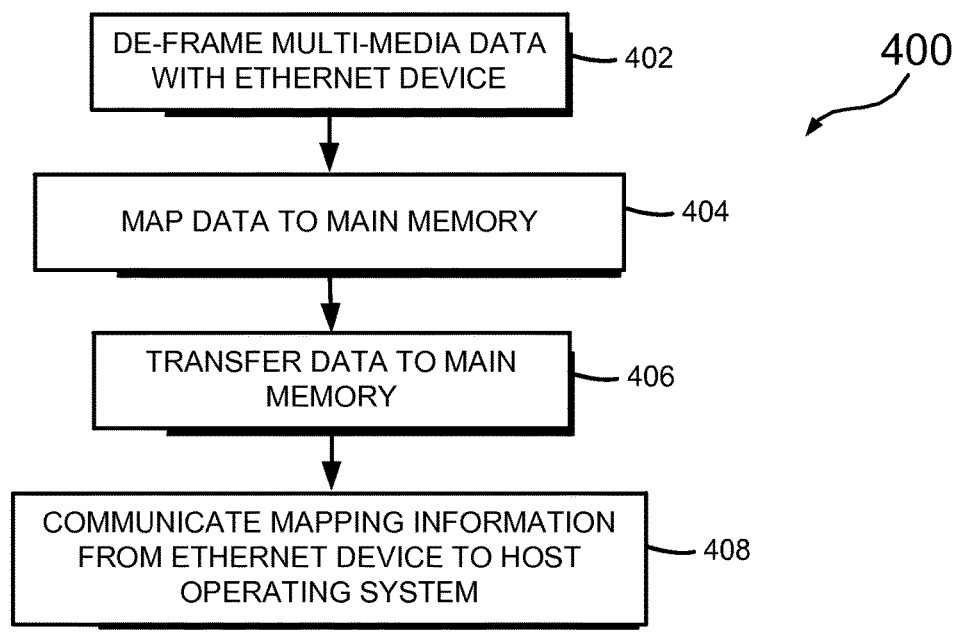
FIG. 4 illustrates a flowchart of steps for one embodiment of a method for processing multi-media data in an Ethernet network.

In operation, the system responds to multi-media data streams by carrying out various processing functions while minimizing usage of the host CPU. FIG. 4 illustrates steps employed during one embodiment of a low-power mode of operation for the system, from the perspective of the Ethernet adapter card. For example, incoming multi-media data streams from an Ethernet network are received by the Ethernet adapter card, and the data extracted and de-framed, at 402, from the transport protocol used such as IEEE 1722. Timestamp information is also added to the multi-media data to guarantee synchronous operation, thereby maintaining a certain level of Quality of Service (QoS) associated with AVB networks. This is carried out prior to data transfer via the PCIe interface, to the main memory 204. The de-framing and extracting also involves allocating main memory address space for storing the multi-media data. This is controlled by the Host operating system and communicated between peripheral drivers via system calls to the Host operating system. The multi-media data may then be transferred to the main memory via the PCIe interface, at 406.

The operating system 216 (FIG. 2) records the memory mapping as an allocation of memory address space for the Ethernet adapter card. The mapping information generated by the Ethernet adapter card may then be communicated to the Host operating system 216, at 408 during initialization. With the mapping information received by the Host operating system during initialization or re-configuration, the video transcoding device may initiate one or more system calls to the Operating System to request access to the memory locations originally allocated to the Ethernet adapter card by, for a Microsoft Windows environment example, setting appropriate Registry flags. While traditionally this might have alerted the system to a potential memory conflict, the Registry is configured to allow for the overlap in memory allocation to both the Ethernet adapter and the video transcoding device.

During regular steady state packet flow, once the multi-media data is accessed, it may then be transferred to the video transcoding device 226, and processed, such as by converting the data into a different format. By enabling the video transcoding device to access the main memory directly via memory mapping information provided by the Ethernet adapter, significant power reductions may be realized by avoiding involvement of the host CPU.

A complementary system embodiment, similar to that shown in FIG. 2, but involving a QPI interface and multiple processor cores connected via the QPI interface, jointly interconnected with the PCIe interface is also possible. Much of the architecture is similar to the embodiment described above and shown in FIG. 2, but a QPI interface is employed as a local I/O bus between the processor cores to logically tie them together and interact with the I/O interface When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation in a system including a system processor, main memory coupled to the system processor, and a serial input/output (IO) interface coupled to the processor, the method comprising:
   de-framing multi-media Ethernet data with an Ethernet peripheral device to generate first date, the Ethernet peripheral device having a serial post coupled to the serial I/O interface, and an Ethernet port to receive the multi-media Ethernet data, the de-framing including embedding a timing reference with the first data;
   generating mapping information for mapping the first data to storage locations in the main memory with the Ethernet peripheral device;
   transferring the first data to the main memory via the serial port, and storing the first data in the storage locations of the main memory in accordance with the mapping information;
   communicating the mapping information from the Ethernet peripheral device to a Host operating system that manages the system processor; and
   wherein a second peripheral device references the mapping information from the Host operating system and directly accesses the main memory storage locations storing the data.

2. The method according to claim 1, further comprising:
   processing the first data with the second peripheral device.

3. The method according to claim 2, wherein the processing includes:
   transcoding the first data.

4. The method according to claim 1, wherein the second peripheral device directly accesses the main memory storage locations by:
   carrying out a data transfer from the main memory with the system processor in a reduced power mode.

5. The method according to claim 1, wherein the multi-media Ethernet data comprises audio video bridging (AVB) data.

6. The method according to claim 1, wherein the Ethernet peripheral device comprises an Ethernet network adapter card.

7. The method according to claim 1, wherein the serial I/O interface comprises a PCIe interface.

8. The method according to claim 1, wherein the generating mapping information includes:
   allocating the storage locations to the Ethernet peripheral device; and wherein the Host operating system enables access to the allocated storage locations for the second peripheral device.

* * * * *